(12) United States Patent
Pettersson et al.

(10) Patent No.: US 12,126,451 B2
(45) Date of Patent: Oct. 22, 2024

(54) METHOD OF ENABLING HARQ, NETWORK ENTITY AND COMPUTER PROGRAM

(71) Applicant: Telefonaktiebolaget LM Ericsson (publ), Stockholm (SE)

(72) Inventors: Charlie Pettersson, Solna (SE); Miguel Lopez, Solna (SE); Leif Wilhelmsson, Lund (SE); Dennis Sundman, Sollentuna (SE); Sebastian Max, Cologne (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 399 days.

(21) Appl. No.: 17/437,603

(22) PCT Filed: Mar. 12, 2020

(86) PCT No.: PCT/EP2020/056640
§ 371 (c)(1),
(2) Date: Sep. 9, 2021

(87) PCT Pub. No.: WO2020/182942
PCT Pub. Date: Sep. 17, 2020

(65) Prior Publication Data
US 2022/0158771 A1 May 19, 2022

Related U.S. Application Data

(60) Provisional application No. 62/817,011, filed on Mar. 12, 2019.

(51) Int. Cl.
*H04L 1/1812* (2023.01)
*H04L 1/1829* (2023.01)
*H04L 1/1867* (2023.01)

(52) U.S. Cl.
CPC .......... *H04L 1/1816* (2013.01); *H04L 1/1864* (2013.01); *H04L 1/1896* (2013.01)

(58) Field of Classification Search
CPC ... H04L 1/1816; H04L 1/1864; H04L 1/1896; H04L 1/1812; H04L 1/1614
See application file for complete search history.

(56) References Cited

U.S. PATENT DOCUMENTS

| 8,832,515 B2 * | 9/2014 | Asterjadhi | H04L 1/1614 |
| | | | 714/748 |
| 2015/0236822 A1 * | 8/2015 | Pirskanen | H04L 1/1864 |
| | | | 370/329 |

(Continued)

OTHER PUBLICATIONS

International Search Report and Written Opinion dated Jun. 15, 2020 for International Application No. PCT/EP2020/056640 filed Mar. 12, 2020, consisting of 8-pages.

(Continued)

*Primary Examiner* — Ivan O Latorre
(74) *Attorney, Agent, or Firm* — Weisberg I.P. Law, P.A.

(57) ABSTRACT

An approach for transmission provides a method of enabling Hybrid Automatic Request, HARQ, in an IEEE 802.11 communication. The method includes transmitting, in an element in a Block Acknowledgement, BA, setup of a Medium Access Control, MAC, message, which element indicates a request to use HARQ, receiving a response to said request, and starting to apply HARQ. The approach includes a network entity of a wireless network using IEEE 802.11. The network entity includes a transmitter arranged to transmit, in an element in a Block Acknowledgement, BA, setup of a Medium Access Control, MAC, message, which element indicates a request to use HARQ, a receiver arranged to receive a response to said request, and a communication handler arranged to start to apply HARQ.

16 Claims, 3 Drawing Sheets

(56) References Cited

U.S. PATENT DOCUMENTS

| | | | |
|---|---|---|---|
| 2016/0380727 A1* | 12/2016 | Ryu | H04L 1/18 |
| | | | 370/245 |
| 2017/0230149 A1 | 8/2017 | Wang et al. | |
| 2019/0007865 A1* | 1/2019 | Karlsson | H04L 1/1864 |
| 2019/0045537 A1* | 2/2019 | Seok | H04L 1/1685 |
| 2020/0259595 A1* | 8/2020 | Seok | H04L 1/1867 |
| 2021/0336719 A1* | 10/2021 | Xin | H04L 1/1893 |

OTHER PUBLICATIONS

IEEE Standard for Information technology—Telecommunications and information exchange between systems, Local and Metropolitan area networks—Specific requirements—Part 11: Wireless LAN Medium Access Control (MAC) and Physical Layer (PHY) Specifications; IEEE Std 802.11b-1999, Dec. 7, 2016, consisting of 3534-pages.

* cited by examiner

METHOD OF ENABLING HARQ, NETWORK ENTITY AND COMPUTER PROGRAM

CROSS-REFERENCE TO RELATED APPLICATIONS

This application is a Submission Under 35 U.S.C. § 371 for U.S. National Stage Patent Application of International Application No.: PCT/EP2020/056640, filed Mar. 12, 2020 entitled "METHOD OF ENABLING HARQ, NETWORK ENTITY AND COMPUTER PROGRAM," which claims priority to U.S. Provisional Application No. 62/817,011, filed Mar. 12, 2019, entitled "HARQ ENABLEMENT FOR WI-FI," the entireties of both of which are incorporated herein by reference.

TECHNICAL FIELD

The present disclosure generally relates to a method of transmission of a data packet, a computer program for implementing the method, and a transceiver device arranged to perform the transmission. In particular, the present disclosure relates to enabling Hybrid Automatic Repeat Request (HARQ) transmissions in an IEEE 802.11 network.

BACKGROUND

IEEE 802.11 data frames are formatted as illustrated in FIG. 1. They contain a header, a frame body and a Frame Check Sequence field (FCS). The Medium Access Control (MAC) header contains, among other things, the address of the intended recipient(s). The frame body may contain one or more MAC Service Data Units (MSDU).

Each MSDU or Aggregated MSDU (A-MSDU) is assigned a sequence number. Moreover, MSDU's are sometimes fragmented, in which case each fragment is also assigned a number. These sequence numbers are contained in the Sequence Control field shown in FIG. 1. The Sequence Control field is formatted as shown in FIG. 2.

The IEEE 802.11 MAC data plane architecture supports frame aggregation, which enhances the throughput by allowing the transmission of two or more data frames in a single packet. Aggregation comes in two flavours. The first is MSDU aggregation (A-MSDU), and the second is MAC Protocol Data Unit (MPDU) aggregation (A-MPDU). Moreover, the two types of aggregation can be combined. An A-MSDU consists of several concatenated subframes, as shown in FIG. 3.

Each A-MSDU subframe is formatted as illustrated in FIG. 4. The Length field contains the subframe length in octets.

An A-MPDU consists of several concatenated subframes, as shown in FIG. 5.

Each A-MPDU subframe is formatted as illustrated in FIG. 6.

Unlike A-MSDU subframes, the A-MPDU subframes contain an MPDU delimiter field, formatted as shown in FIG. 7.

The current IEEE 802.11 technology does not support HARQ, which would be beneficial compared with ARQ as it leads to higher throughput. Moreover, the current ARQ mechanism is wasteful of bandwidth because a frame comprising many codewords is retransmitted even when only one codeword (or a few of the codewords) was erroneous. US 2017/0230149 A1 suggests an approach for communicating a feedback in a wireless local area network where a device in the network receives an indicator on HARQ in a frame header.

It is therefore a desire to find a solution to at least alleviate the above discussed issues at least for some situations.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that HARQ may be a beneficial approach for use also in IEEE 802.11 communication. The inventors have thus realized that by a slight modification of certain parts of setup communication, an improvement in transmissions can be achieved.

According to a first aspect, there is provided a method of enabling Hybrid Automatic Request, HARQ, in an IEEE 802.11 communication. The method comprises transmitting, in an element in a Block Acknowledgement, BA, setup of a Medium Access Control, MAC, message, which element indicates a request to use HARQ, receiving a response to said request, and starting to apply HARQ.

The response may comprise at least one of BA type, buffer size, and BA timeout value for the sequence.

Bits of a BA bitmap in a NACK during application of HARQ may indicate which codewords are erroneously received. The BA bitmap may have a 1-to-N mapping where each bit corresponds to a segment of N codewords, where N is an integer corresponding to a minimum number of codewords of a retransmission. The integer N may be a variable for different codeword segments in a multi-layer transmission enabling variable preciseness in reporting. The BA bitmap may have varying size and may indicate respective segment numbers for segments, i.e. N bundled codewords, with an erroneous reception. The BA bitmap may indicate a first and a last segment of a series of segments with erroneous reception.

A header of a MAC Service Data Unit subframe may contain a redundancy version, RV, for incremental redundancy at repeated transmission.

According to a second aspect, there is provided a network entity of a wireless network using IEEE 802.11. The network entity comprises a transmitter arranged to transmit, in an element in a Block Acknowledgement, BA, setup of a Medium Access Control, MAC, message, which element indicates a request to use HARQ, a receiver arranged to receive a response to said request, and a communication handler arranged to start to apply HARQ.

The response may comprise at least one of BA type, buffer size, and BA timeout value for the sequence.

Bits of a BA bitmap in a NACK during application of HARQ may indicate which codewords are erroneously received. The BA bitmap may have a 1-to-N mapping where each bit corresponds to a segment of N codewords, where N is an integer corresponding to a minimum number of codewords of a retransmission. The integer N may be a variable for different codeword segments in a multi-layer transmission enabling variable preciseness in reporting. The BA bitmap may have varying size and may indicate respective segment numbers for segments with an erroneous reception. The BA bitmap may indicate a first and a last segment of a series of segments with erroneous reception.

A header of a MAC Service Data Unit subframe may contain a redundancy version, RV, for incremental redundancy at repeated transmission.

According to a third aspect, there is provided a computer program comprising instructions which, when executed on a processor of a network entity, causes the network entity to perform the method of the first aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
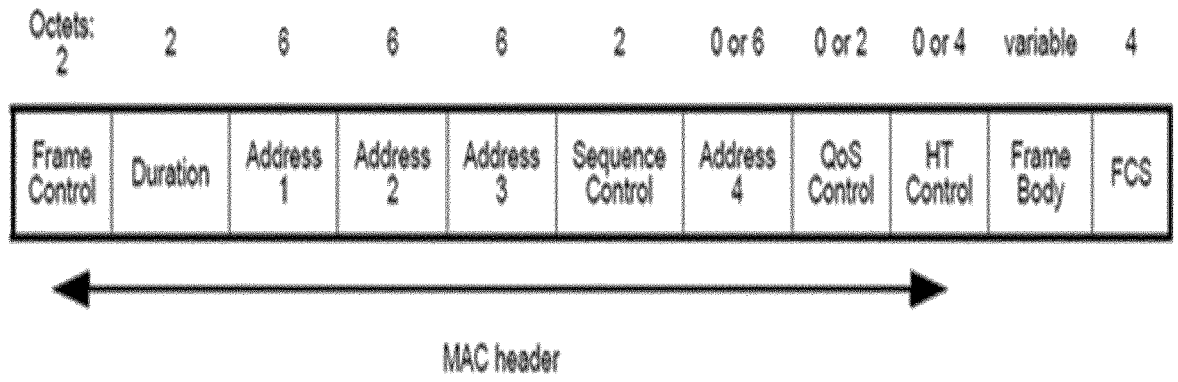
FIG. 1 is a diagram illustrating an IEEE 802.11 data frame.
Figure 2:
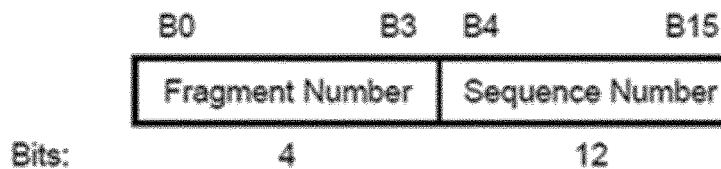
FIG. 2 is a diagram illustrating sequence control field formatting.
Figure 3:
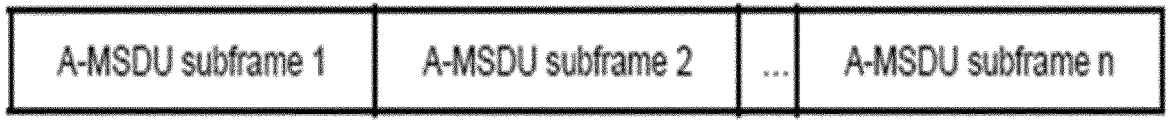
FIG. 3 is a diagram illustrating concatenated subframes for A-MSDU.
Figure 4:
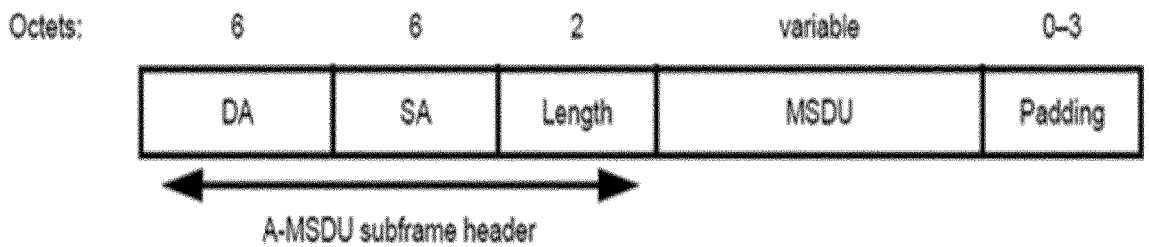
FIG. 4 is a diagram illustrating A-MSDU formatting.
Figure 5:
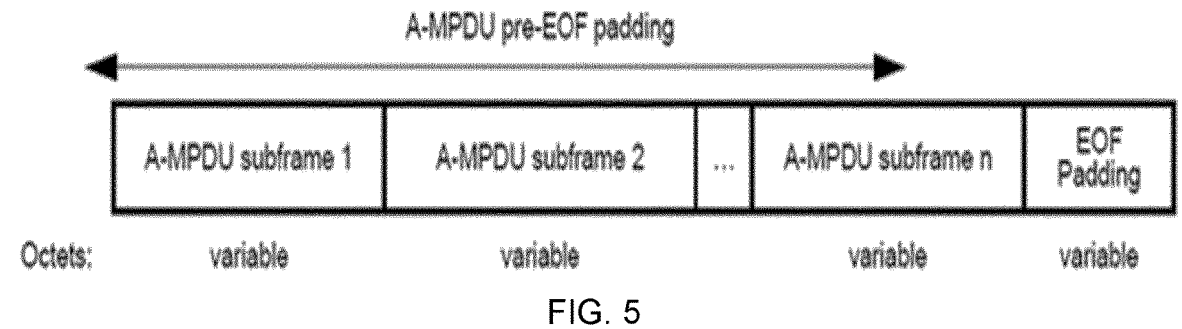
FIG. 5 is a diagram illustrating concatenated subframes for A-MPDU.
Figure 6:
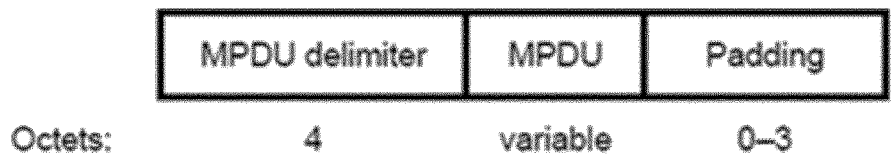
FIG. 6 is a diagram illustrating A-MPDU formatting.
Figure 7:
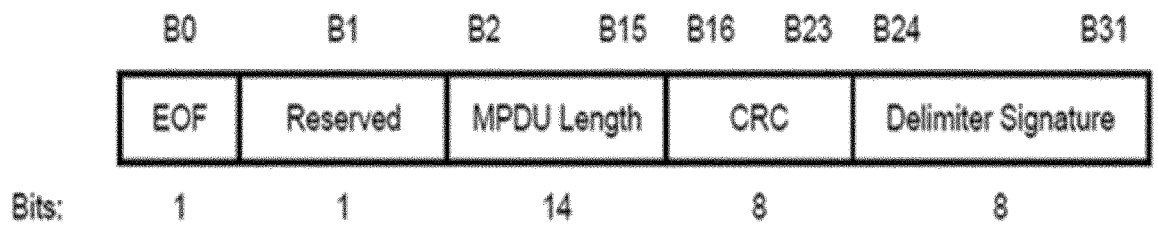
FIG. 7 is a diagram illustrating MPDU delimiter field formatting for A-MPDU subframes.

In wireless systems it is commonplace to use forward error correction (FEC) codes in combination with automatic retransmission request (ARQ) to ensure that the data is correctly received. That is, the information that is to be transmitted is encoded so that the probability of a decoding error is decreased, and in the event that a decoding error occurs the receiver may send a negative acknowledgement (NACK) to the transmitter so that the erroneous packet can be retransmitted.

Since the received packet contains some information about the transmitted data even if the data could not be correctly recovered, it is possible to combine the information obtained in the first, erroneous, transmission with the additional data obtained in a retransmitted packet. This will further enhance the performance but comes at a cost since information from the first packet needs to be stored and later combined with the information obtained from the later received packet.

Combining FEC and ARQ is commonly referred to as hybrid ARQ (HARQ). This technique has not been used for IEEE 802.11 communications, but the proposed solutions below are intended for alleviating that. The most common flavours of HARQ are Chase combining (CC) and incremental redundancy (IR).

In the former case the non-correctly received packet is retransmitted and by combining two or more versions of the packet in the receiver an energy gain is effectively obtained leading to improved performance. In the latter case, additional parity bits are transmitted in subsequent transmissions leading to that in addition to an energy gain there will also be a coding gain. Typically, IR is based on that the original code is of relative low rate, say ¼, and that one successively as long as the codeword is not correctly decoded, adds more and more parity bits.

One of the big advantages of using HARQ instead of ARQ is that in case of an erroneous transmission, there is still some useful information transmitted from the transmitter to the receiver that can be used in the subsequent decoding. Since a decoding error in this way is less harmful, it typically allows for a more opportunistic use of the channel, i.e., packets can be sent at a slightly higher data rate on average.

In IEEE 802.11 compliant devices today, ARQ is used to retransmit data frames that were not correctly received by the recipient. A device will receive a data frame, check an FCS and if correctly decoded, it will send an acknowledgement to the transmitter to indicate that the frame has been correctly received. When using Low Density Parity Check (LDPC) codes, a data frame will often consist of many codewords (often several tens of codewords). For transmissions containing many codewords, even if just a single codeword does not get correctly received, the whole frame must be retransmitted.

In the IEEE 802.11 standard, the procedure for which an ARQ sequence is started is initiated by an exchange of data frames. This exchange of data frames can be done in the form of a single data MSDU or as part of an A-MSDU sequence. It can also be directed to a single device or many devices by using OFDMA. These data frames are then decoded, FCS checked, and finally reported back to the transmitter in the form of an Acknowledgement/Block Acknowledgement (ACK/BA). If a data frame was not correctly decoded by the receiver, the acknowledgement frame will contain a bit or bit map indicating the MSDU or which MSDUs in the A-MSDU were erroneous. The ARQ procedure will then recreate the faulty MSDU and schedule it for retransmission. This might lead to a waste of resources as an MSDU might contain many codewords, some of which might have been correctly received already. This is an effect of the low granularity of the ARQ feature that only allows retransmission of entire frames.

The 802.11 standard allows multiple ways of acknowledging reception of data but in the case of very high throughput devices, using A-MPDUs together with BA is mandatory. A-MPDUs allow a transmitting STA to aggregate many subframes together into a larger frame. This increases efficiency as the STA does not have to contend for channel access as frequently as well as not having to wait for an acknowledgement every time a data frame is sent. But it requires the receiver to respond with a BA containing a bitmap indicating which frames in the A-MPDU were correctly received. In the 802.11 standard there are multiple ways to setup this BA agreement depending on what type of agreement the devices can support.

Figure 8:
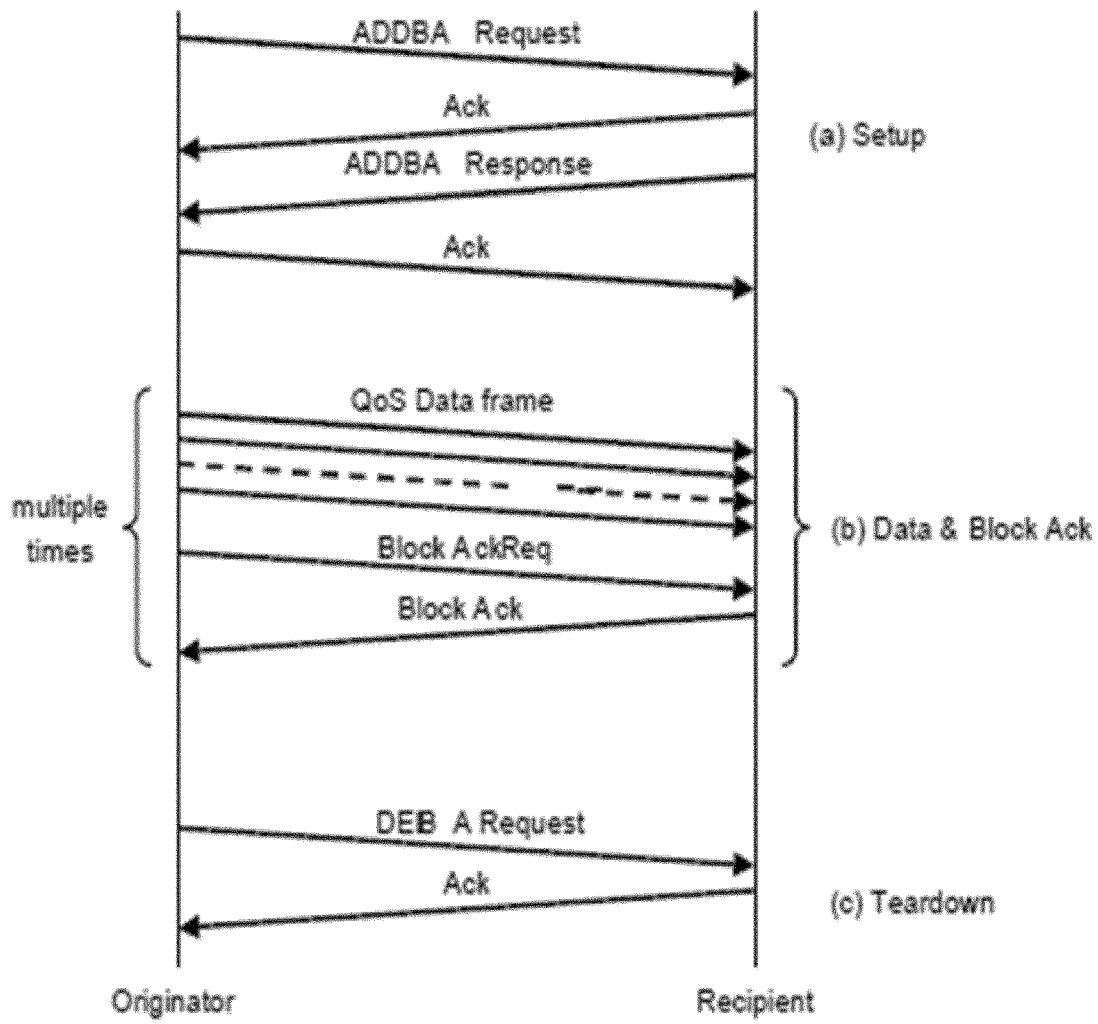
FIG. 8 is a signalling diagram illustrating BA signalling.

The BA sequence has three phases according to the IEEE 802.11 standard: setup, Data & BA and Teardown. The setup phase begins by the originator sending an ADDBA request were information such as the Traffic Identifier (TID), the starting sequence number of this agreement and BA policy are transmitted. This is followed by either an acceptance or rejection of the BA request (if it is rejected then normal ack policy will be used for the rest of the data exchange). If it is accepted then the originator will also respond with an ADDBA response which contains fields such as BA type, buffer size and BA timeout value for the sequence. Finally, the ADDBA response is also acknowledged by the originator and the BA agreement is setup. This procedure is illustrated in FIG. 8.

After the initial setup the data exchange phase can begin. Depending on the BA type specified in the setup, the procedure can look different but for the sake of this explanation we will use the Immediate BA type. It starts with the originator sending QoS data frames in A-MPDU segments. These segments can be of varying length depending on how much data needs to be sent and how long the originator has a Transmit Opportunity (TXOP) etc. A single A-MPDU segment can never be longer than the buffer size indicated in the ADDBA response frame by the recipient. These data frames could be separated into different TXOPs, sent to different TID in the same TXOP and be sent to different receiving addresses. Following these data frames, a BAR is sent by the originator to request acknowledgements for frames that have been transmitted. The recipient will then, upon reception of the BAR, send a BA that contains the starting sequence number, and a bitmap of all the acknowledged MSDUs in the A-MPDU. These exchanges of data frames can occur multiple times over many TXOPs until all the data has been acknowledged or expired at the originators side.

Lastly, the teardown phase is initiated by the originator by sending a DELBA request which is followed by a normal acknowledgement. Though it may only send a DELBA request if it does not have any BA, BAR or data frames to send to the peer of the TID that the BA agreement were setup for.

For data transfer between High Efficiency (HE) Wi-Fi devices the most commonly used BA and BARs are the compressed variant. The compressed BA currently has an encoding table such as in Table 1.

With the introduction of 802.11 ax and High Efficiency (HE) devices, it also became possible for multiple STAs to send data to their AP simultaneously by using OFDMA. As such, the AP needs to acknowledge multiple transmissions, and the BA also had to be modified accordingly. The multi-STA BA serves that purpose and functions as many aggregated BAs with different AID and TID fields after one another. These BAs has a slightly different fragmentation table that can be seen in Table 2.

TABLE 1

Fragmentation table for the compressed block acknowledgment from draft 3.2

| Fragment Number subfield | | | Fragmentation Level 3 (ON/ OFF) | Block Ack Bitmap subfield length (octets) | Maximum number of MSDUs/A-MSDUs that can be acknowledged |
|---|---|---|---|---|---|
| B3 | B2-B1 | B0 | | | |
| 0 | 0 | 0 | OFF | 8 | 64 |
| 0 | 1 | 0 | | Reserved | Reserved |
| 0 | 2 | 0 | | 32 | 256 |
| 0 | 3 | 0 | | Reserved | Reserved |
| 0 | 0 | 1 | ON | 8 | 16 |
| 0 | 1 | 1 | | Reserved | Reserved |
| 0 | 2 | 1 | | 32 | 64 |
| 0 | 3 | 1 | | Reserved | Reserved |
| 1 | Any | Any | | Reserved | Reserved |

NOTE
A Compressed BlockAck frame with B0 of the Fragment Number subfield set to 1 is not sent to an HE STA whose Fragmentation Support subfield(#16339) in the HE Cabilities element it transmits is not set to 3 (see 27.3 (Fragmentation and defragmentation)).

TABLE 2

Fragmentation table for the multi user BA as of draft 3.2 of the 802.11ax standard.

| Fragment Number subfield | | | Fragmentation Level 3 (ON/ OFF) | Block Ack Bitmap subfield length (octets) | Maximum number of MSDUs/A-MSDUs that can be acknowledged |
|---|---|---|---|---|---|
| B3 | B2 B1 | B0 | | | |
| 0 | 0 | 0 | OFF | 8 | 64 |
| 0 | 1 | 0 | | 16 | 128 |
| 0 | 2 | 0 | | 32 | 256 |
| 0 | 3 | 0 | | 4 | 32 |
| 0 | 0 | 1 | ON | 8 | 16 |
| 0 | 1 | 1 | | 16 | 32 |
| 0 | 2 | 1 | | 32 | 64 |
| 0 | 3 | 1 | | 4 | 8 |
| 1 | Any | Any | | Reserved | Reserved |

NOTE
A Multi-STA BlockAck frame with B0 of the Fragment Number subfield set to 1 can only be sent to an HE STA whose Fragmentation Support subfield(#16339) in the HE Capabilities element it transmits is 3 (see 27.3 (Fragmentation and defragmentation)).

HARQ procedures and the benefits thereof have not been able for IEEE 802.11 communications, but the proposed solutions below are intended for alleviating that. By adding minimal changes to the IEEE 802.11 solution it is possible to enable the use of HARQ, by adding a signalling element indicating whether HARQ is activated, e.g. a field in the PHY layer SIG-field or as part of the ADDBA that will indicate if this is a HARQ transmission. The format of the Block Ack report is kept, but the interpretation of the fields depends on whether HARQ is used. In case HARQ is used, fragmentation is disabled and the fragment subfield in the block ack is remapped to a codeword identifier subfield. Firstly, the proposed solution increases the granularity in the feedback so that codewords correctly received do not need to be retransmitted. Secondly, the proposed solution enables IEEE 802.11-enabled devices to support HARQ with minimum changes to the specification, and also to limit changes of design of devices to keep cost low and enablement easy.

A first step in enabling HARQ in IEEE 802.11 is to signal to the receiver that HARQ is supported during a frame exchange. This can be accomplished as follows. During the BA setup sequence (e.g. ADDBA request), the transmitter indicates (in an information element) the intention to use HARQ. Otherwise, a new information element in the ADDBA request can be added. The ADDBA request is illustrated in Table 3. An alternative procedure consists of introducing one or more bits to indicate the use of HARQ in the signal field (SIG) in the PHY header of any (PLCP Protocol Data Unit) PPDUs transmitted by the originator in a block ack session. This step is in fact sufficient to enable the use of HARQ in IEEE 802.11. During the setup, the recipient would be made aware that it can store the soft bits corresponding to erroneous MSDUs. This is all that is needed for HARQ if Chase combining is used.

Figure 9:
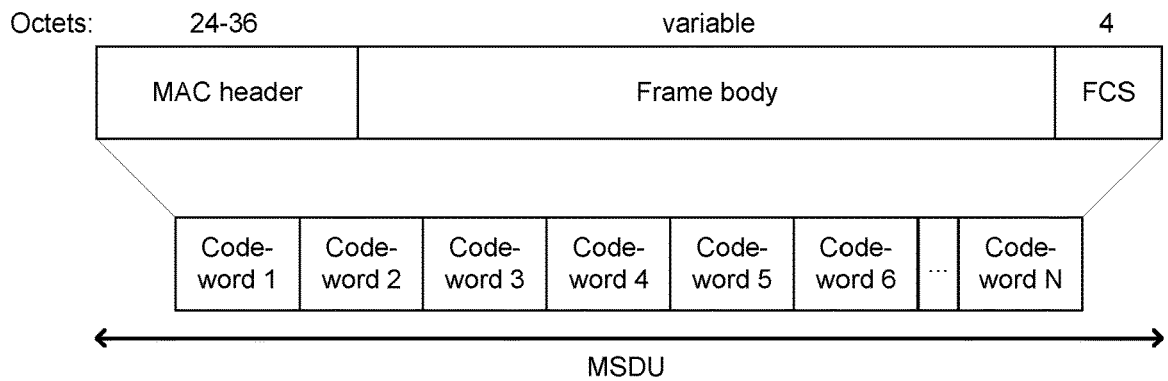
FIG. 9 illustrates MSDU frame format.

A second step in enabling HARQ in IEEE 802.11 is to make it more efficient, by remapping the fragment fields to indicate the codewords that require retransmission. Fragmentation is typically used when the bandwidth is limited, so that the PPDUs are not too long. In case a large bandwidth is available and high throughput is desired, the disclosure proposes to use the indication of HARQ (as described above) to imply that the fragment bits are remapped to instead indicate erroneously received codewords. The recipient may, for example, verify whether the parity check equations are satisfied for any given codeword. If the CRC fails for an MSDU, then retransmission is requested only for those codewords comprised in the MSDU for which the parity check equations were not satisfied. The originator will interpret the fragment field in the BA ack report as missing codewords to be retransmitted, instead of retransmitting the whole MSDU, which frame format can be seen in FIG. 9. Suppose that we have a transmission containing 32 codewords where all codewords were correctly decoded except number 5 and 22. Since the FCS corresponds to the whole frame, it would not be able to point out which of the codewords were faulty, but instead the decoding of the LDPC code could provide this information. So in a 1 to 1 mapping the transmission would be responded with a 4 byte BA bitmap were each bit corresponds to a different codeword. This means that the bitmap would have the value 1 for all bits except bit 5 and 22 which would be 0.

A third step in enabling HARQ in IEEE 802.11 is to introduce support for Incremental Redundancy (IR). This can be accomplished, for example, by adding a new subfield to the MSDU header or A-MSDU subframe header, indicating the redundancy version. The originator will populate this field according to the parity bits used in the encoding of the MSDU or A-MSDU subframe, and by reading this field the recipient will know how to combine the soft bits corresponding to the received frame/subframe with buffered soft bits corresponding to the same information bits.

Figure 10:
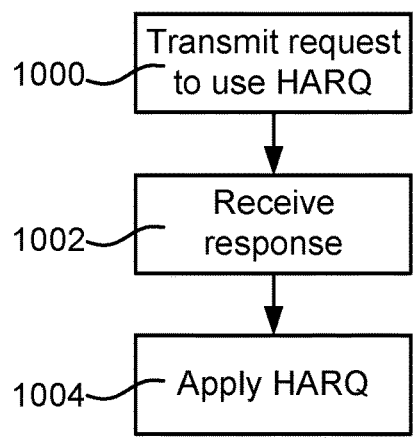
FIG. 10 is a flow chart illustrating methods according to embodiments.

FIG. 10 is a flow chart illustrating methods according to embodiments. The methods aim at enabling HARQ in IEEE 802.11 communication. The method comprises transmitting 1000 a request to use HARQ. This is performed by an element in a Block Acknowledgement, BA, setup, which is transmitted in a MAC message. In response to the request,

TABLE 3

Parameters in the ADDBA request.

| Name | Type | Valid range | Description |
| --- | --- | --- | --- |
| PeerSTAAdress | MACAddress | N/A | Specifies the address of the peer MAC entity with which to perform the block ack initiation (or modification). |
| DialogToken | Integer | 0-255 | Identifies the ADDBA transaction. |
| TID | Integer | 0-15 | Specifies the TID of the data. |
| BlockAckPolicy | Enumeration | Immediate, Delayed | Specifies the block ack policy. |
| BufferSize | Integer | 0-1023 | Specifies the number of MPDUs that can be held in its buffer. |
| BlockAckTimeout | Integer | 0-65 535 | Specifies the number of TUs without a frame exchange between peers after which the block ack agreement is considered to be torn down. |
| BlockAckStartingSequenceControl | BlockAck Starting Sequence Control subfield | As defined in 9.3.1.7 (BlockAckReq frame format) | Specifies the value of the Block Ack Starting Sequence Control subfield. |
| GCRGroupAddress | GCR Group Address element | As defined in 9.4.2.125 (GCR Group Address element) | Specifies the group address for which a block ack agreement is requested. If the element is present, a GCR Group Address element is included in the transmitted ADDBA Request frame. |
| Multi-band | Multi-band element | As defined in 9.4.2.138 (Multi-band element) | Specifies the frequency band and channel number where the block ack agreement is to be established The parameter is absent if the block ack agreement is intended to be established on the same frequency band and channel where the ADDBA Request frame is transmitted. |
| TCLAS | TCLAS element | As defined in 9.4.2.30 (TCLAS element) | Zero or more TCLAS elements. Specifies the rules and parameters by which an MSDU might be classified to the specified TID. |
| ADDBA Extension | ADDBA Extension element | As defined in 9.4.2.139 (ADDBA Extension element) | Specifies additional parameters associated with the block ack agreement. |
| VendorSpecificInfo | A set of elements | As defined in 9.4.2.25 (Vendor Specific element) | Zero or more elements. |

It would be possible for the originator to decide how many codewords correspond to each bit in the fragment subfield. This gives flexibility to be used depending on how the traffic, link and frequency allocation looks like at different times. The information of the faulty codewords will be stored at the receiver to be used with the next re-transmission as is needed for HARQ. This will enable support of HARQ as the granularity of acknowledgement has been moved from frame level down to the level of one or several codewords.

a response is received 1002. Assuming that the response did not indicate that HARQ is not possible, e.g. in case the other station does not have any capability for HARQ, the method proceeds with starting 1004 to apply HARQ. The response may comprise capabilities and/or desired settings for HARQ. For example, the response may comprise information about BA type, buffer size, BA timeout value for the sequence, etc. The response may also comprise an acceptance to use fragmentation, wherein bits of a BA bitmap in a NACK during application of HARQ indicate which codewords are erroneously received. The BA bitmap may have a 1-to-N mapping where each bit corresponds to a segment on N codewords, where N is an integer corresponding to a minimum number of codewords of a retransmission. N may be fixed, or variable for different codeword segments in a multi-layer transmission enabling variable preciseness in reporting. The BA bitmap may have varying size, wherein it can indicate respective segment numbers for segments with an erroneous reception, e.g. indicate that segments 3, 5 and 20 contained errors. The BA bitmap may indicate a first and a last segment of a series of segments with erroneous reception, e.g. indicate that segments 3 to 6 contained errors. These may of course be combined such that a bitmap for example can indicate that segments 3, 5, 8 to 12, and 22 contained errors.

The HARQ can be based on for example chase combining or incremental redundancy. In for example an incremental redundancy approach, a header of a MAC Service Data Unit subframe may contain a redundancy version, RV.

Figure 11:
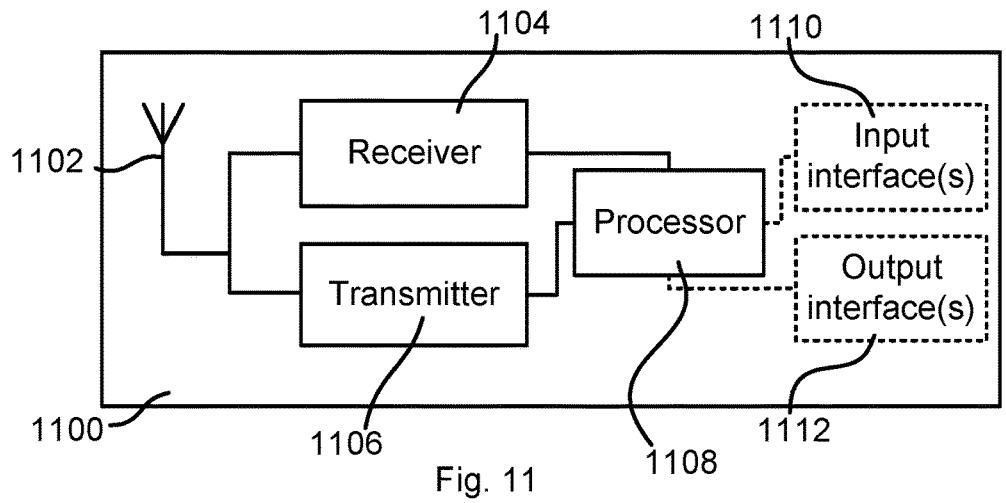
FIG. 11 is a block diagram schematically illustrating a transceiver device according to an embodiment.

FIG. 11 is a block diagram schematically illustrating a transceiver device 1100, e.g. an access point or station, according to an embodiment. The transceiver device 1100 comprises an antenna arrangement 1102, a receiver 1104 connected to the antenna arrangement 1102, a transmitter 1106 connected to the antenna arrangement 1102, a processing element 1108 which may comprise one or more circuits, one or more input interfaces 1110 and one or more output interfaces 1112. The interfaces 1110, 1112 can be user interfaces and/or signal interfaces, e.g. electrical or optical. The transceiver device 1100 is arranged to operate in a cellular communication network. In particular, by the processing element 1108 being arranged to perform the embodiments demonstrated with reference to FIG. 9, the transceiver device 1100 is capable of providing an adapted packet which enables a receiver to perform soft combining as discussed above. The processing element 1108 can also fulfil a multitude of tasks, ranging from signal processing to enable reception and transmission since it is connected to the receiver 1104 and transmitter 1106, executing applications, controlling the interfaces 1110, 1112, etc.

Figure 12:
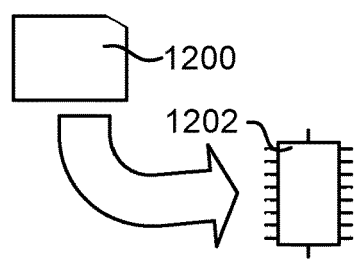
FIG. 12 schematically illustrates a computer-readable medium and a processing device.

The methods according to the present disclosure is suitable for implementation with aid of processing means, such as computers and/or processors, especially for the case where the processing element 1108 demonstrated above comprises a processor handling identification of the first set of control information and re-mapping of the packet. Therefore, there is provided computer programs, comprising instructions arranged to cause the processing means, processor, or computer to perform the steps of any of the methods according to any of the embodiments described with reference to FIG. 9. The computer programs preferably comprise program code which is stored on a computer readable medium 1200, as illustrated in FIG. 12, which can be loaded and executed by a processing means, processor, or computer 1202 to cause it to perform the methods, respectively, according to embodiments of the present disclosure, preferably as any of the embodiments described with reference to FIG. 9. The computer 1202 and computer program product 1200 can be arranged to execute the program code sequentially where actions of the any of the methods are performed stepwise. The processing means, processor, or computer 1202 is preferably what normally is referred to as an embedded system. Thus, the depicted computer readable medium 1200 and computer 1202 in FIG. 12 should be construed to be for illustrative purposes only to provide understanding of the principle, and not to be construed as any direct illustration of the elements.

The disclosure enables HARQ in IEEE 802.11 while remaining to a large extent backwards compatible. The proposed enhancements to IEEE 802.11 are minor and should be relatively easy to implement in existing IEEE 802.11 chipsets by means of firmware or software updates. This disclosure may be summarized by the following items:

1. A method of enabling Hybrid Automatic Request, HARQ, in an IEEE 802.11 communication, the method comprising
transmitting, in an element in a Block Acknowledgement, BA, setup of a Medium Access Control, MAC, message, which element indicates a request to use HARQ;
receiving a response to said request; and
starting to apply HARQ.

2. The method of item 1, wherein the response comprises at least one of
BA type;
buffer size; and
BA timeout value for the sequence.

3. The method of item 1 or 2, wherein bits of a BA bitmap in a NACK during application of HARQ indicate which codewords are erroneously received.

4. The method of item 3, wherein the BA bitmap has a 1-to-N mapping where each bit corresponds to a segment of N codewords, where N is an integer corresponding to a minimum number of codewords of a retransmission.

5. The method of item 4, wherein N is a variable for different codeword segments in a multi-layer transmission enabling variable preciseness in reporting.

6. The method of any one of items 3 to 5, wherein the BA bitmap has varying size and indicates respective segment numbers for segments with an erroneous reception.

7. The method of any one of items 3 to 6, wherein the BA bitmap indicates a first and a last segment of a series of segments with erroneous reception.

8. The method of any one of items 1 to 7, wherein a header of a MAC Service Data Unit subframe contains a redundancy version, RV, for incremental redundancy at repeated transmission.

9. A network entity of a wireless network using IEEE 802.11, the network entity comprising
a transmitter arranged to transmit, in an element in a Block Acknowledgement, BA, setup of a Medium Access Control, MAC, message, which element indicates a request to use HARQ;
a receiver arranged to receive a response to said request; and
a communication handler arranged to start to apply HARQ.

10. The network entity of item 9, wherein the response comprises at least one of
BA type;
buffer size; and
BA timeout value for the sequence.

11. The network entity of item 9 or 10, wherein bits of a BA bitmap in a NACK during application of HARQ indicate which codewords are erroneously received.

12. The network entity of item 11, wherein the BA bitmap has a 1-to-N mapping where each bit corresponds to a segment of N codewords, where N is an integer corresponding to a minimum number of codewords of a retransmission.

13. The network entity of item 12, wherein N is a variable for different codeword segments in a multi-layer transmission enabling variable preciseness in reporting.

14. The network entity of any one of items 11 to 13, wherein the BA bitmap has varying size and indicates respective segment numbers for segments with an erroneous reception.

15. The network entity of any one of items 11 to 14, wherein the BA bitmap indicates a first and a last segment of a series of segments with erroneous reception.

16. The network entity of any one of items 9 to 15, wherein a header of a MAC Service Data Unit subframe contains a redundancy version, RV, for incremental redundancy at repeated transmission.

17. A computer program comprising instructions, which when executed on a processor of a network entity causes the network entity to perform the method of any one of items 1 to 8.

The invention claimed is:

1. A method of enabling Hybrid Automatic Request, HARQ, in an IEEE 802.11 communication, the method comprising:
   transmitting, in an element in a Block Acknowledgement, BA, setup of a Medium Access Control, MAC, message, which element indicates a request to use HARQ;
   receiving a response to the request;
   starting to apply HARQ; and
   bits of a BA bitmap in a NACK during application of HARQ indicating which codewords are erroneously received, and a fragment subfield in the BA being remapped to a codeword identifier subfield, the BA bitmap having a 1-to-N mapping, each bit of the BA bitmap corresponding to a segment of N codewords, where N is an integer corresponding to a minimum number of codewords of a retransmission.

2. The method of claim 1, wherein the response comprises at least one of:
   BA type;
   buffer size; and
   BA timeout value for the sequence.

3. The method of claim 2, wherein bits of a BA bitmap in a NACK during application of HARQ indicate which codewords are erroneously received.

4. The method of claim 2, wherein the BA bitmap has varying size and indicates respective segment numbers for segments with an erroneous reception.

5. The method of claim 2, wherein the BA bitmap indicates a first and a last segment of a series of segments with erroneous reception.

6. The method of claim 1, wherein N is a variable for different codeword segments in a multi-layer transmission enabling variable preciseness in reporting.

7. The method of claim 1, wherein the BA bitmap has varying size and indicates respective segment numbers for segments with an erroneous reception.

8. The method of claim 1, wherein the BA bitmap indicates a first and a last segment of a series of segments with erroneous reception.

9. The method of claim 1, wherein a header of a MAC Service Data Unit subframe contains a redundancy version, RV, for incremental redundancy at repeated transmission.

10. A network entity of a wireless network using IEEE 802.11, the network entity comprising:
    a transmitter arranged to transmit, in an element in a Block Acknowledgement, BA, setup of a Medium Access Control, MAC, message, which element indicates a request to use HARQ;
    a receiver arranged to receive a response to the request; and
    a communication handler arranged to start to apply HARQ, bits of a BA bitmap in a NACK during application of HARQ indicating which codewords are erroneously received, and a fragment subfield in the BA being remapped to a codeword identifier subfield, the BA bitmap having a 1-to-N mapping, each bit of the BA bitmap corresponding to a segment of N codewords, where N is an integer corresponding to a minimum number of codewords of a retransmission.

11. The network entity of claim 10, wherein the response comprises at least one of:
    BA type;
    buffer size; and
    BA timeout value for the sequence.

12. The network entity of claim 10, wherein N is a variable for different codeword segments in a multi-layer transmission enabling variable preciseness in reporting.

13. The network entity of claim 10, wherein the BA bitmap has varying size and indicates respective segment numbers for segments with an erroneous reception.

14. The network entity of claim 10, wherein the BA bitmap indicates a first and a last segment of a series of segments with erroneous reception.

15. The network entity of claim 10, wherein a header of a MAC Service Data Unit subframe contains a redundancy version, RV, for incremental redundancy at repeated transmission.

16. A non-transitory computer storage medium providing non-transitory storage of a computer program comprising instructions, which when executed on a processor of a network entity causes the network entity to perform a method of enabling Hybrid Automatic Request, HARQ, in an IEEE 802.11 communication, the method comprising:
    transmitting, in an element in a Block Acknowledgement, BA, setup of a Medium Access Control, MAC, message, which element indicates a request to use HARQ;
    receiving a response to the request; and
    starting to apply HARQ; and
    bits of a BA bitmap in a NACK during application of HARQ indicating which codewords are erroneously received, and a fragment subfield in the BA being remapped to a codeword identifier subfield, the BA bitmap having a 1-to-N mapping, each bit of the BA bitmap corresponding to a segment of N codewords, where N is an integer corresponding to a minimum number of codewords of a retransmission.

* * * * *